United States Patent [19]
Hisatomi et al.

[11] Patent Number: 5,999,766
[45] Date of Patent: Dec. 7, 1999

[54] IMAGE PROCESSING APPARATUS WITH USER AUTHORIZATION MECHANISM

[75] Inventors: Kenji Hisatomi; Hideyuki Kuwano; Naoki Takahashi; Takehito Yamaguchi; Yuji Okada, all of Osaka-fu; Kazuyuki Murata, Kyoto-fu, all of Japan

[73] Assignee: Matsushita Electric Industrial Co., Ltd., Osaka-fu, Japan

[21] Appl. No.: 09/035,000

[22] Filed: Mar. 5, 1998

[30] Foreign Application Priority Data

Mar. 5, 1997 [JP] Japan .................................. 9-049991

[51] Int. Cl.$^6$ .................................................. G03G 15/00
[52] U.S. Cl. .............................. 399/80; 399/81; 399/366
[58] Field of Search ................................. 399/8, 10, 80, 399/81, 82, 83, 84, 88, 366; 395/101, 114, 115, 116, 117, 144, 148; 358/296, 501

[56] References Cited

FOREIGN PATENT DOCUMENTS 4-183175  6/1992  Japan .

Primary Examiner—Matthew S. Smith
Assistant Examiner—Hoan Tran
Attorney, Agent, or Firm—McDermott, Will & Emery

[57] ABSTRACT

An image processing apparatus for storing and reading out image data. An authorization code inputting element reads in an authorization code from an authorization medium on which a particular authorization code is recorded and a user identification inputting element inputs user identification information including the individual user authorization number issued at the time of the user being registered. A user control element controls the users by the authorization code and the user identification information, and a function-limiting element limits the scope of functions that can be used by the user in case the user can not be identified by the inputted authorization code or the inputted user identification information. Thus, the storing of image data by an unidentified user can be blocked, and the confidentiality of stored imaged data can be secured.

13 Claims, 11 Drawing Sheets

| Authorization code | User authorization number | User | Registration date |
|---|---|---|---|
| xxxxx1 | 1234 | Micky | 1996. 01. 08 |
| xxxxx2 | 2222 | Donald | 1996. 12. 25 |
| xxxxx3 | 3456 | Goofy | 1997. 01. 28 |
| ⋮ | ⋮ | ⋮ | ⋮ |

User control information table

| Authorization code (11) | User authorization number (12) | User (13) | Date of registration (14) | Group Identification (15) | | |
|---|---|---|---|---|---|---|
| | | | | A | B | C |
| xxxxx1 | 1234 | Micky | | 1 | 0 | 0 | ···①
| xxxxx2 | 2222 | Donald | | 1 | 0 | 1 | ···②
| xxxxx3 | 3456 | Goofy | | 0 | 1 | 0 | ···③
| ⋮ | ⋮ | ⋮ | | ⋮ | ⋮ | ⋮ |

FIG. 7

File control table

| File name (21) | Registration date (22) | Last access date (23) | Registrant | Information on access right (24) | | | |
|---|---|---|---|---|---|---|---|
| | | | | A | B | C | All |
| file 1 | ··· | ··· | 1234 | 1 | 0 | 0 | 0 | ···①
| file 2 | ··· | ··· | 1234 | 1 | 0 | 1 | 0 | ···②
| file 3 | ··· | ··· | 1234 | 1 | 0 | 0 | 1 | ···③
| file 4 | ··· | ··· | 1234 | 0 | 0 | 0 | 0 | ···④
| file 5 | ··· | ··· | 3456 | 0 | 1 | 0 | 0 | ···⑤
| file 6 | ··· | ··· | 2222 | 1 | 0 | 1 | 0 | ···⑥
| ⋮ | ⋮ | ⋮ | ⋮ | ⋮ | ⋮ | ⋮ | ⋮ |

| Authorization code | User authorization number | User | Registration date |
|---|---|---|---|
| xxxxx1 | 1234 | Micky | 1996. 01. 08 |
| xxxxx2 | 2222 | Donald | 1996. 12. 25 |
| xxxxx3 | 3456 | Goofy | 1997. 01. 28 |
| ⋮ | ⋮ | ⋮ | ⋮ |

| Authorization code | User authorization number | User | Registration date |
|---|---|---|---|
| xxxxx4 | 1234 | Micky | 1996. 01. 08 |
| xxxxx2 | 2222 | Donald | 1996. 12. 25 |
| xxxxx3 | 3456 | Goofy | 1997. 01. 28 |
| ⋮ | ⋮ | ⋮ | ⋮ |

FIG. 13 PRIOR ART

IMAGE PROCESSING APPARATUS WITH USER AUTHORIZATION MECHANISM

FIELD OF THE INVENTION

The present invention relates to an image processing apparatus for storing and reading out image data.

BACKGROUND OF THE INVENTION

The progress of digital technology has made it possible not only to copy or print image data on paper but also to store those image data as file in such media as magnetic disk, optical disk and optomagnetic disk. In the copying apparatus field, too, there has been continuing technological development as represented by digital integrated machine which incorporates the functions of printer, facsimile and other devices. Furthermore, a digital integrated machine with such a filing function as aforementioned incorporated additionally therein is beginning to be commercialized. In the apparatus like the copying machine which is in common use by a plurality of people, however, stored data are shared and such data as can not very well be made public are subject to easy access. An image copying apparatus which solves such a problem is disclosed in the Japanese patent laid-open publication No.4-183175.

Figure 13:
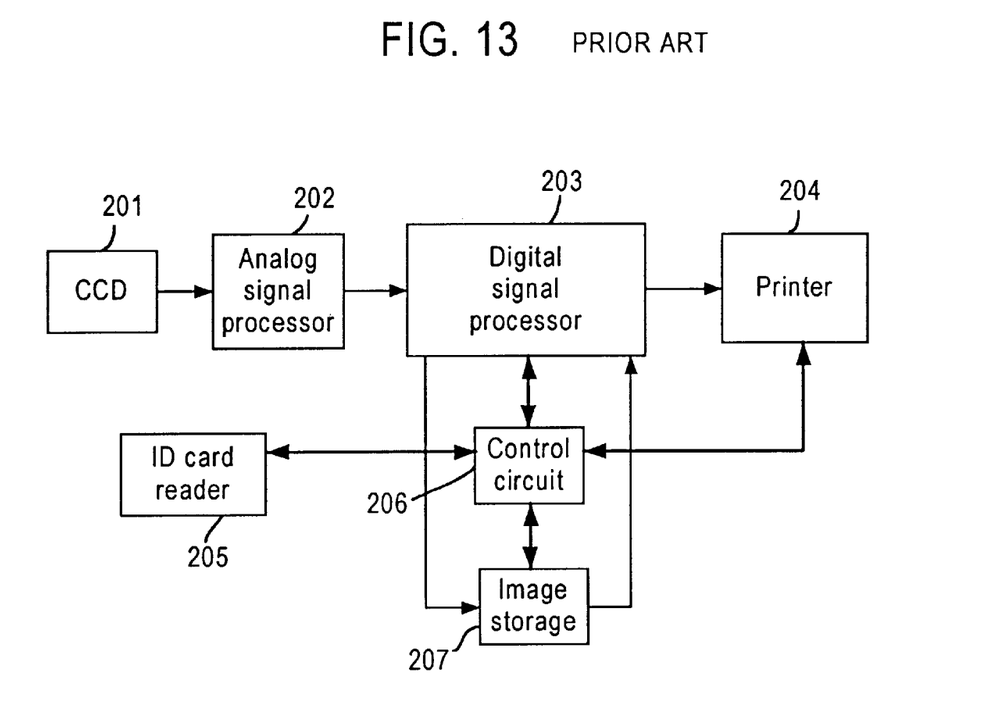
FIG. 13 is a schematic diagram of an example of the conventional image copying apparatuses.

Now, the configuration of the foregoing image copying apparatus is shown in FIG. 13 and the outline thereof is described hereinafter with reference to the drawing.

First, the identification (ID) card of the user is inserted into the ID card reader 205 and the user's ID code memorized on the card is read out and stored on the memory of the control circuit 206.

The original image placed on the original stand is optically read in by CCD 201 and turned into electric signals. The output from CCD is amplified by an analog signal processor 202 and then digitized by a digital signal processor 203, followed by signal processing including shading correction. A control circuit 206 regulates the flow of image data, and the read-in image data are stored in an image storage 207. These stored image data are printed on paper by a printer 204. Thus the copying ends.

Another ID card is inserted into the ID card reader. If the ID code of the second user is different from that stored on the memory of the aforesaid control circuit 206, the image data in the foregoing image storage 207 will be erased. If, on the other hand, the ID code is identical with that of the first user, the recopying lamp will go on, indicating to the user that the foregoing image data stored in the foregoing image storage 207 can be printed again. If the user chooses to recopy, the printer 204 will output the image data stored in the aforementioned image storage 207.

This image copying apparatus can secure the confidentiality of image data, because it erases the image data stored in the above-mentioned image storage 207 if the ID code of the new user is not identical with that of the previous user. However, since the image data stored in the image storage 207 is erased when another person with a different ID code uses the machine as described, the first user with the identical ID code can not pick out the image data in the image storage again. The image data is already lost.

In the network use of the computer, access to the computer is regulated by the user's identification and password system, which has been long utilized.

Unlike with such equipment as computer, the use of ID and password makes it complicated to operate such office automation (OA) apparatus as copying machine of which the inputting means is limited, and it is apparently troublesome, especially for those who are not familiar with the computer. There is also developed a copying machine which regulates access by magnetic card, for example. But this system is originally intended for accounting the fee of copying service, and if a valid card is available, the machine allows unlimited use to anyone. For this reason, this system as it is now can not be used where a high confidentiality is required as is today.

In view of such circumstances as described, the present invention is disclosed for the purpose of providing an image processing apparatus which can secure the confidentiality of stored image data without making the operation complicated.

SUMMARY OF THE INVENTION

To effect the foregoing object, the present invention adopts the means described below on an image processing apparatus for storing the inputted image data in an image storage means 108 and outputting the image data newly inputted or stored in the aforesaid image storage means 108 by image outputting means 110. That is to say, the above-mentioned image processing apparatus forms the basis of the present invention.

In the aforementioned invention, the image processing apparatus controls the user corresponding to the authorization code and the user's ID by a user control means 104. In this situation, the user directs an authorization code inputting means 102 to read the authorization code recorded on an authorization medium. The user then directs a user ID inputting means to input the user's ID information which includes the user authorization number of its own issued when the user was registered.

The user controlling means 104 specifies the user based on above authorization code inputted by the authorization code inputting means 102 and the user ID information inputted by the user ID inputting means. When the user is not specified, however, the function-limiting means 106 limits the functions available to the user.

The above function-limiting means 106 is designed to limit such functions as a function to store the image data in an image storage means 108 and a function to read out the image data stored in the image storage means 108 and to output such data from above image outputting means 110.

This arrangement can identify the user if the user authorization number is inputted by the user ID inputting means even when the authorization medium is not available at hand. Also, if the user is not registered, the use of the image processing apparatus can be limited. This way, the filing of image data by an unidentified person can be blocked and the confidentiality of the stored image data can be secured.

It may also be configured that the user control means 104 controls group identification information which indicates the user's group, in addition to the user corresponding to the authorization code and user ID information. The image data control means 105 controls the user who registered each image data as well as the access information that limits the access to each image data by respective user.

The user control means 104 extracts group identification information as well as specifies the user based on above authorization code inputted from the authorization code inputting means 102 and the user ID information inputted from the user ID inputting means. Further the image data control means 105 extracts the user who registered the image data and the access right to that particular image data. And then a function-limiting means 106 limits readout of above image data from image storage means based on the information on the user, group identification and access right specified or extracted in this way.

The access right information controlled by the image data control means 105 in relation to the image data is composed of group identification information corresponding to the user who registers the image data, specified by the user control means 104. The access right can also be set as necessary by the user who registers the image data.

Thus, it limits the readout of the image data as unit and, therefore, can effectively raise the confidentiality of the stored image data.

EMBODIMENTS OF THE INVENTION

Embodiment 1

Figure 1:
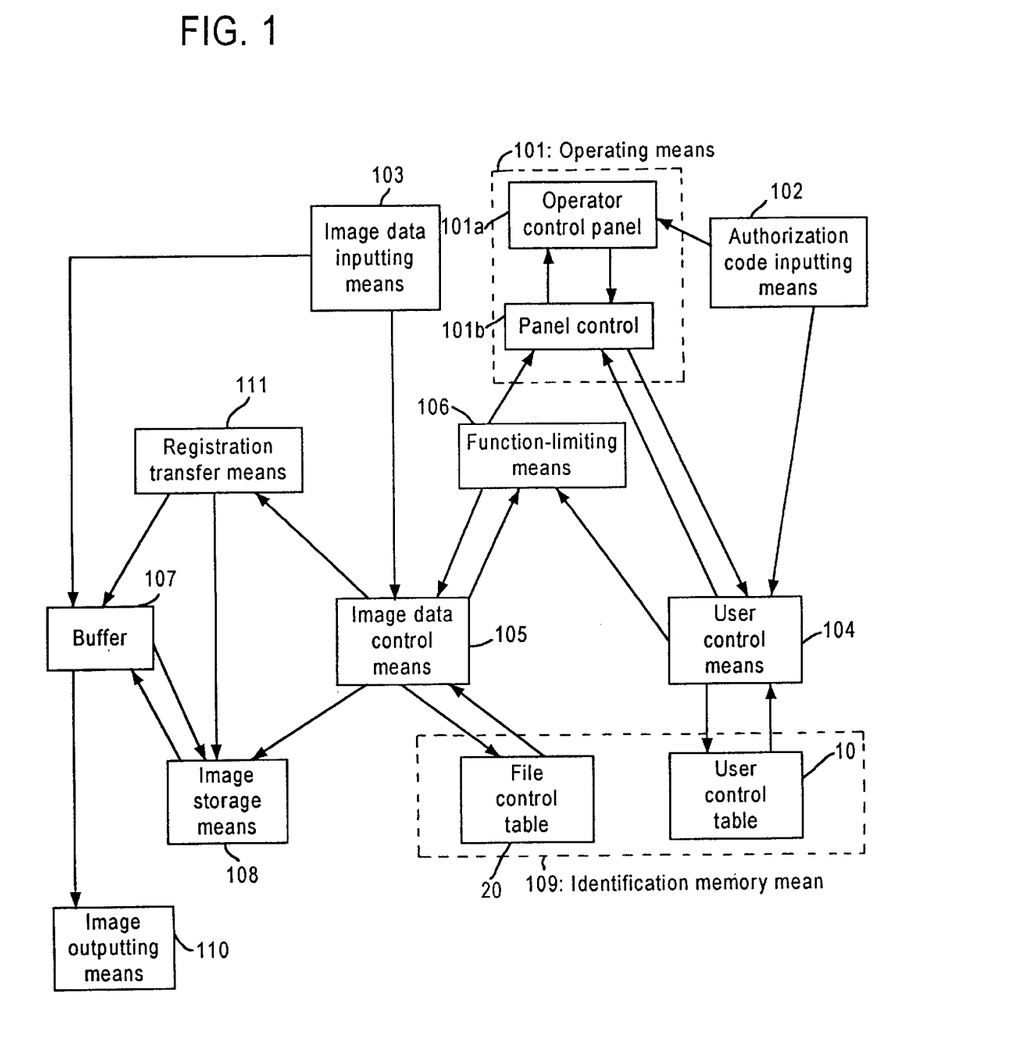
FIG. 1 is a block diagram showing the configuration of an embodiment of the present invention.

Referring now to the drawings, the configuration and operation will be described hereinafter. FIG. 1 shows the configuration of the image processing apparatus in an embodiment of the present invention while FIG. 2 illustrates the flow chart of the operational process.

Figure 2:
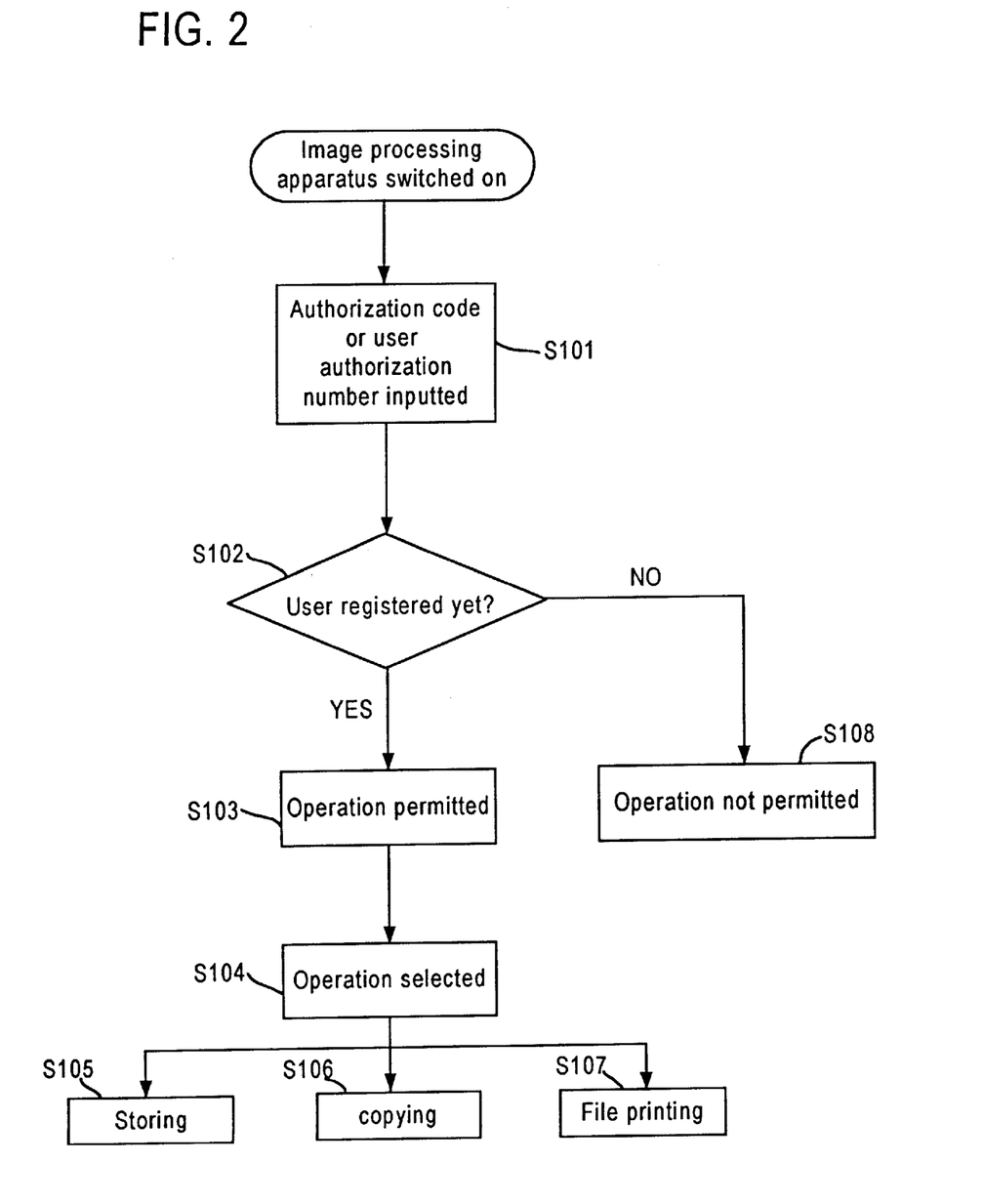
FIG. 2 is a flow chart showing the operational process in an embodiment of the present invention.

First, the user inserts such an authorization medium as a magnetic card with a distinctive code recorded thereon into authorization code inputting means 102 like a magnetic card reader or inputs the user authorization number on an operator control panel 101*a* in the operating means 101 provided with a plurality of keys as ten-key board or an LCD with a touch panel (FIG. 2—Step S 101).

In case the authorization card is inserted in the above step, the authorization code inputting means 102 reads out the authorization code recorded on the authorization medium and notifies the user control means 104. If the user authorization number is inputted on the operator control panel 101*a* instead, the user authorization number is held in a panel control 101*b* of the operating means 101, which will notify the user control means 104 of the user authorization number if the execute button on the operator control panel 101*a* is pressed.

The user control means 104, which controls the users by a user control table 10 described in the following, decides by consulting the user control table 10 whether the authorization code or the user authorization number of the user is registered when notified of the authorization code from the authorization code inputting means 102 or notified of the user authorization number from the operating means 101, and notifies the function-limiting means 106 of the decision (Step 102).

Figure 3:
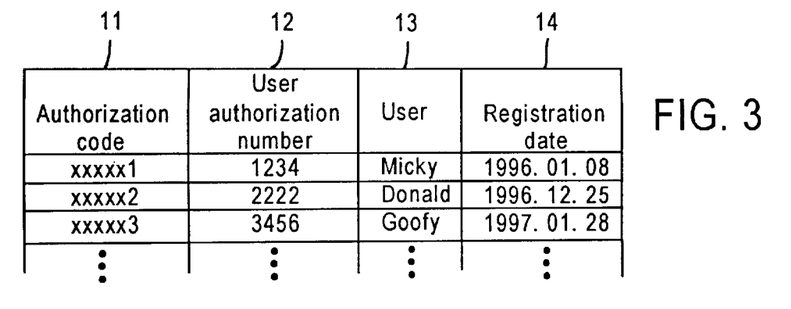
FIG. 3 is a conceptual diagram showing an example of the user control table of the present invention.

The user control table 10 contains such information as the authorization codes 11 recorded on the authorization medium as, for example, shown in FIG. 3, the distinctive user authorization numbers 12 issued at the time of the user being registered, the users' names 13 as full names or nicknames by which the user can be identified and the registration date 14 which indicates the date when the user is registered by the image storage means 108 as hard disk, for example. It is noted that for the authorization code 11, a code of many figures would cause no inconveniences because it is recorded on the authorization medium, but the user authorization number 12 should be a small one as the user inputs it on the operator control panel 101*a* by finger.

In the next step, if the decision notified from the user control means 104 indicates that the user is registered, the function-limiting means 106 issues an operation permit, notifying the image data control means 105 and the panel control 101*b*. Notified of the operation permit, the panel control 101*b* notifies the user that the apparatus is now ready for use as by changing LED in the execute button from red to green (Step S 103).

If, on the other hand, the decision notified from the user control means 104 indicates that the user is not registered, the function-limiting means 106 does not issue an operation permit, notifying the image data control means 105 and the panel control 101*b* that the operation is not permitted. Receiving the operation refusal notification, the panel control 101*b* indicates on the operator control panel 101*a* that the user is not registered (Step S 108).

In case the authorization medium is inserted with the back side up or some other kind of authorization medium is inserted, the authorization code inputting means 102 also notifies the panel control 101*b* of the wrong authorization medium insertion and the panel control 101*b* displays on the operator control panel 101*a* that the authorization medium insertion is faulty.

When the apparatus is ready for use, then the user chooses the operation to be executed on the operator control panel 101*a* (Step S 104). In the present embodiment, the first operation to be executed by the user is filing in which the original image is read in by image data inputting means 103 as optical reader image scanner and the read-in original image data is digitized and stored in the image storage means 108 (Step S 105). The second operation is copying in which the image data read in by the image data inputting means 103 is printed on such media as paper and OHP sheet by the image outputting means 110 as, for example, electrophotographic printer (Step S 106). The third operation is file outputting in which the image data filed in the image storage means 108 is ouputted from the image outputting means 110 (Step S 107).

In the next step, if the chosen operation is inputted from the operator control panel 101*a*, this operation direction is held in the panel control 101b, and the panel control 101b notifies the image data control means 105 of the operation direction based on the operation permit of the function-limiting means 106, if the execute button on the operator control panel 101a is pressed. And the image data control means 105 acts according to the operation direction.

In the image processing apparatus of the present embodiment, the authorization code inputting means 102 and the user ID inputting means are provided as shown, whereby the user authorization number can be inputted from the operator control panel 101a for identification of the user even if the authorization medium is not at hand. Besides, any person who is not registered with the user control means 104 is denied access to the apparatus.

It is noted that the present embodiment is described in the case of the limit so set as to deny all the functions, but it is possible to confine the limit to the operations involving access to the image storage means 108 as, for example, filing and file outputting; in this case, too, the confidentiality of the image storage means 108 can be secured. Also, the limit can be placed not only on the functions with access to the image storage means 108 but also on any other function.

The operating means 101 also functions as user ID inputting means in which case the user authorization number is inputted on the operator control panel 101a. Furthermore, the input on the operator control panel 101a offers selection of such parameters as the number of copies and the control of the sorter and such operation modes as copying and filing. The display on the operator control panel 101a is provided with a function of conveying to the user information on the condition of the image processing apparatus, errors and other messages.

In the foregoing embodiment, it is possible to so arrange the authorization code to be recorded on the authorization medium that it is made up of running numbers. In this way, distinctive and individual authorization media can be prepared simply, which are easy to control. There will now be explained the process of recording a distinctive and running authorization code of running number for each authorization medium.

Figure 4:
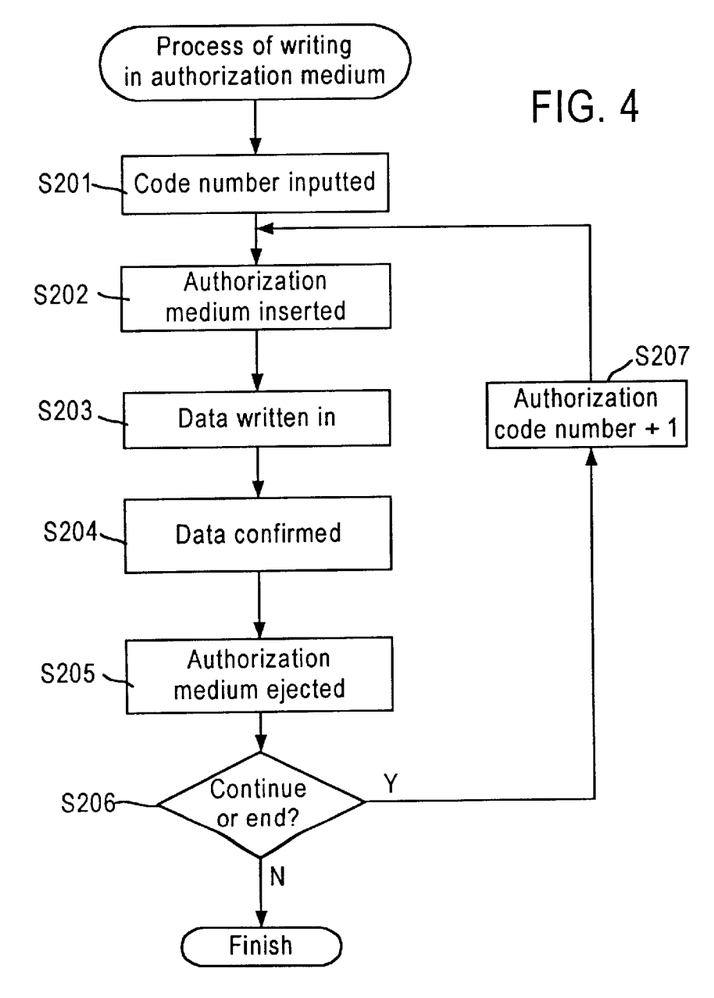
FIG. 4 is a flow chart showing the process of recording an authorization code on the authorization medium.

First, an authorization code to be recorded on the first medium is inputted (FIG. 4, Step S 201). And the authorization medium on which the authorization code is to be recorded is inserted into the writer (Step S 202), and the authorization code is written in (Step S 203). If the written-in authorization code is confirmed (Step S 204), the authorization medium is ejected (Step S 205). If another authorization medium needs to be recorded, the authorization code is renewed once (from Step S 206 to S 207), leaving the writer to wait for the second authorization medium to be inserted. This way, authorization media with running authorization codes can be prepared in a very simple sequence.

It is also noted that even if the image processing apparatus of the present embodiment is one provided with a facsimile function or a function of printing out data as from the personal computer, the aforementioned functions can be effected the same way.

It is now to be understood that the original image is a kind of information and includes everything from letters, characters, figures and diagrams to photos printed on paper, plastic sheet, plastic film and others as opposed to the human eye and such artificial eyes as optical character reader (OCR).

Embodiment 2

Referring to the drawings, there will be explained the configuration and operation of filing image data in the image processing apparatus in another embodiment of the present invention. Since the main points of the configuration are the same as those of Embodiment 1, the description will be made with reference to FIG. 1 and will be omitted on the areas identical with those in the configuration of Embodiment 1.

Figure 5:
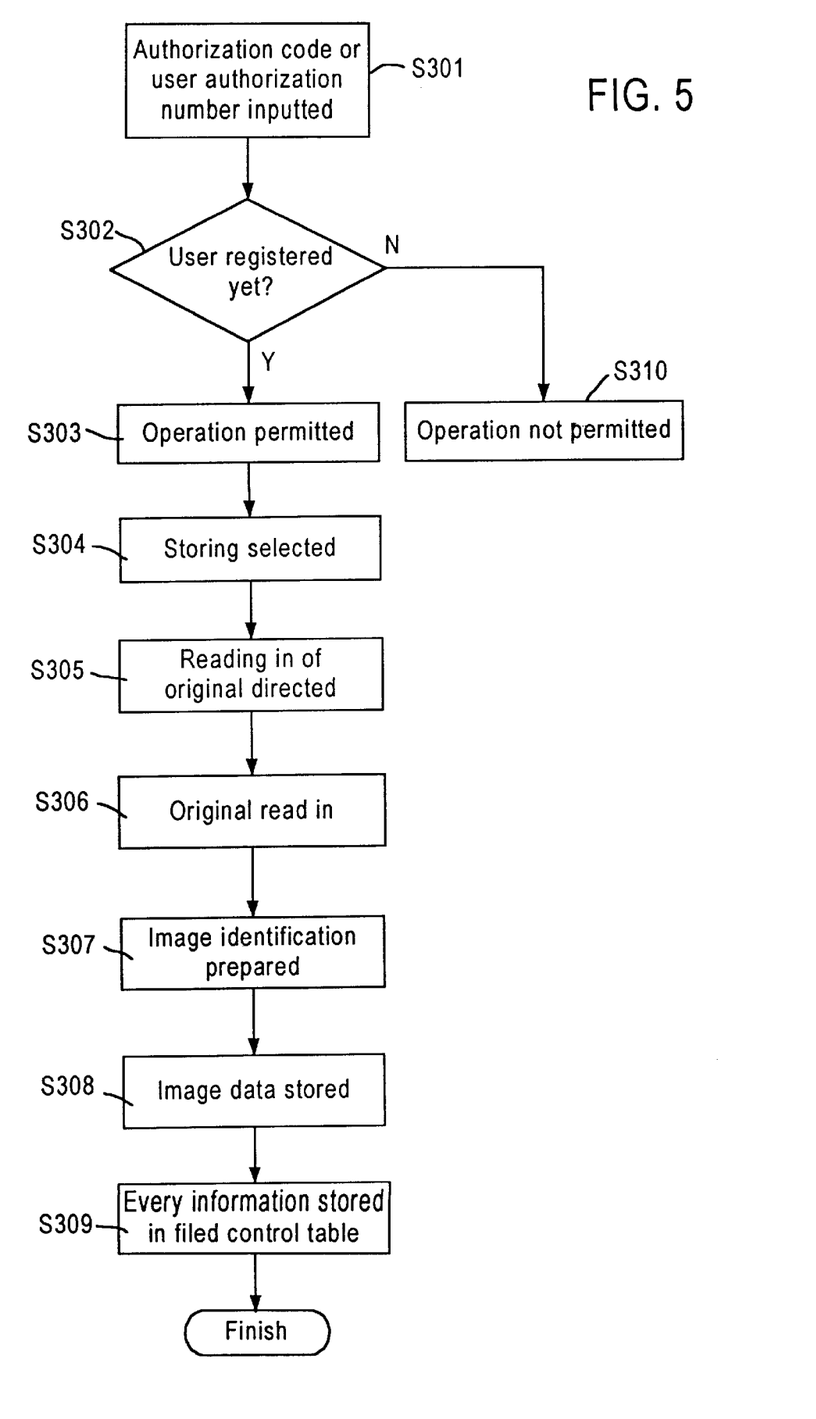
FIG. 5 is a flow chart showing the operational process of filing image data in an embodiment of the present invention.

As in Embodiment 1, the user first inserts the authorization medium into the authorization code inputting means 102 or inputs the user authorization number on the operator control panel 101a (FIG. 5—Step S 301).

In case the authorization card is inserted in the above step, the authorization code inputting means 102 reads out the authorization code recorded on the authorization medium and notifies the user control means 104. If the user authorization number is inputted on the operator control panel 101a instead, the user authorization number is held in a panel control 101b of the operating means, which will notify the user control means 104 of the user authorization number if the execute button on the operator control panel 101a is pressed.

The user control means 104 decides by contacting the user control table 10 whether the authorization code or the user authorization number of the user is registered when notified of the authorization code from the authorization code inputting means 102 or notified of the user authorization number from the operating means 101 as described above, and then notifies the function-limiting means 106 of the decision (Step 302).

Figure 6:
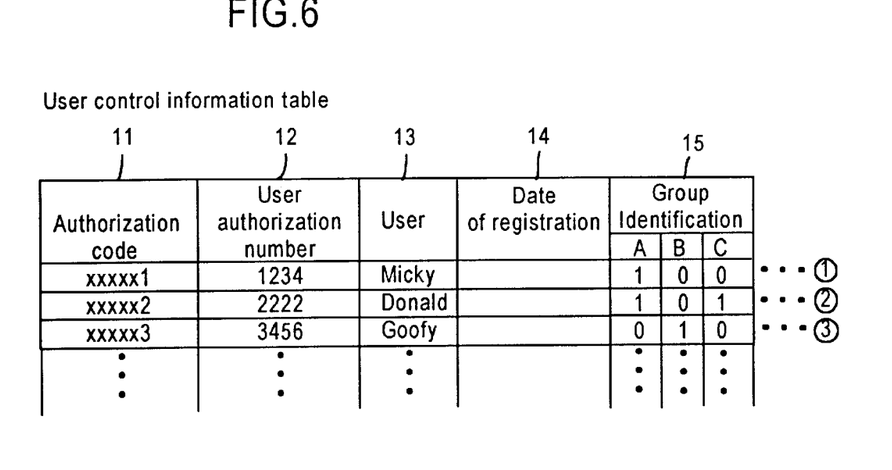
FIG. 6 is a conceptual diagram showing another example of the user control table of the present invention.

Here, the user control table 10 controls the group identification information 15 that shows to which group the user belongs as, for example, is shown in FIG. 6 in addition to the configuration in Embodiment 1. If the decision indicates that the user is registered, the user control means 104 notifies the function-limiting means 106 of the user authorization number 12 and the group identification information 15 on the user.

In the next step, if the decision notified from the user control means 104 indicates that the user is registered, the function-limiting means 106 issues an operation permit as in Embodiment 1, notifying the user that the apparatus is ready for use (Step S 303).

If, on the other hand, the decision notified from the user control means 104 indicates that the user is not registered, the function-limiting means 106 does not issue an operation permit, notifying the image data control means 105 and the panel control 101b of the decision. Receiving the operation refusal notification, the panel control 101b indicates on the operator control panel 101a that the filing operation is not permitted (Step S 310).

When the apparatus is ready for use, then the user chooses the operation to be executed (in this case, filing) on the operator control panel 101a (Step S 304). Then, this operation direction is held in the panel control 101b, and if the execute button on the operator control panel 101a is pressed, the panel control 101b directs the image data inputting means 103 to read in the original copy according to the operation permit of the function-limiting means 106 and also directs the image data control means 105 to do filing of the image data (Step S 305).

As directed, the image data inputting means 103 reads in and digitizes the original and stores the data in a buffer 104 (Step S 306). At the same, the image data control means 105, which is directed to file the image data, produces image identification (ID) for the image data to be filed (Step S 307).

Then, registration transfer means 111 gives the image data stored in the buffer a file name based on the image ID received from the image data control means 105, filing the image data in the image storage means 108 (Step S 308).

Figure 7:
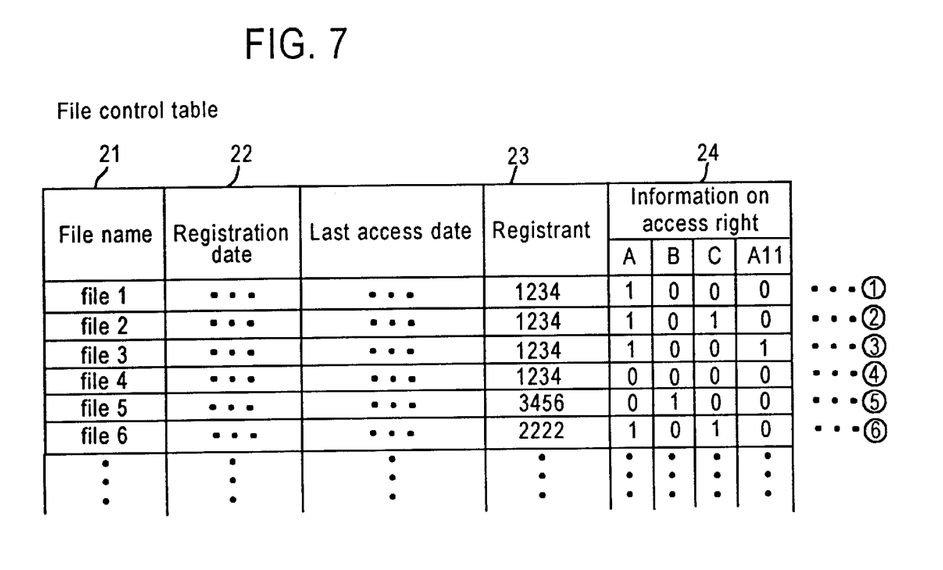
FIG. 7 is a conceptual diagram showing an example of the file control table of the present invention.

Here, the image data control means 105 stores such information as the file name 21 for the image data to be stored, registration date 22 indicating the date when the image data is registered, the registrant person number 23 and the access right information 24 in the file control table 20 of the attribution identification memory means 109 as, for example, is shown in FIG. 7 (Step S 309).

For the registrant person number 23 specified by the user control means 106, the user authorization number 12 is used.

The access right information 24 which indicates the scope accessible to the image storage means 108 is memorized on the file control table 20 with the group identification information 15 reflected as it is, the group identification information notified to the function-limiting means 106 along with the user authorization number. Here, it is possible to set the access right information. In designating the filing operation, for example, the user who registers image data, can choose and input one of the access right information modes on the operator control panel 101a. For example, the user can choose among the following modes: the mode that the image data are open not only to his or her group but also to other groups, the mode that the image data are open to all users and the mode that the image data are not open to other than the user who registered the data.

The access right information 24 is now explained on the assumption that a user who belongs to Group A registers image data.

In the absence of designation, the access right information 24 indicates Group A to which the user belongs (FIG. 7, ①). If the user chooses the mode that the image data are open not only to his or her group but also to another group (Group C, for example), the access right information 24 indicates the user's group and Group C as well (see FIG. 7, ②). If the user chooses the mode that the image data are open to all the users, then the access right information 24 indicates Group A and all the other groups (see FIG. 7, ③). If the user chooses the mode that the image data are not open to other than the user himself or herself, the access right information 24 indicates no group, with Group A erased (FIG. 7, ④).

The user who registered the data can also change the access right information 24 set as above as necessary even after the image data are stored.

Embodiment 3

Figure 8:
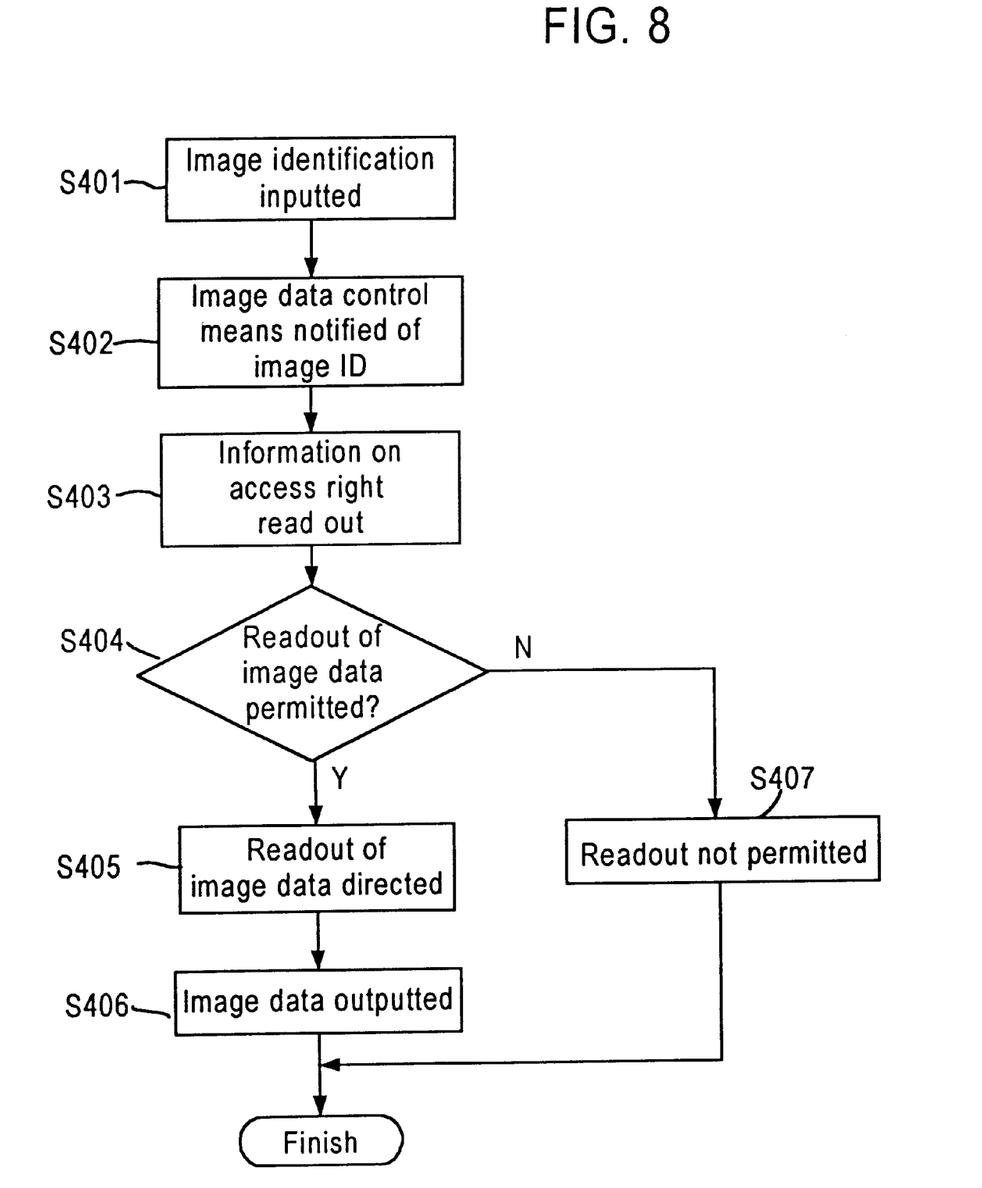
FIG. 8 is a flow chart showing the operational process of reading out image data in an embodiment of the present invention.

Referring to the image processing apparatus described in Embodiment 2, there is now explained the process of specifying image data by image ID and reading out the image data. FIG. 8 is a flow chart showing this process.

As in Embodiment 2, the user first inserts the authorization medium into the authorization code inputting means 102 or inputs the user authorization number on the operator control panel 101a.

The subsequent operation is carried out in the same way as in Embodiment 2 including the identification of the user by the user control means 104 and the issuing of operation permit by the function-limiting means 106.

When the apparatus is ready for use, then the user chooses the operation to be executed (in this case, file outputting) on the operator control panel 101a and inputs the ID for the image data to be read out (FIG. 8, Step S 401). Then, this operation direction and the image ID are held in the panel control 10b, and if the execute button on the operator control panel 101a is pressed, the panel control 101b notifies the image data control means 105 of the image ID and to direct the same to read out the data with the operation permit of the function-limiting means 106 (Step S 402).

The image data control means 105 gets access to the file control table 20 and reads out the registrant person number 23 connected with the image ID and the access right information 14, and notifies the function-limiting means 106 (Step S 403).

Whether to permit the read-out of the image data, the function-limiting means 106 decides on the basis of identification of the registrant person number 23 of the image data to be read out and the access right information 24 which have been notified from the image data control means 105 and the user authorization number of the user and the group identification information which have been supplied from the user control means 104 (Step S 404). That is to say, if the group contained in the group identification information 24 is found in the access right information 24 of the image data, permit is given for the image data to be read out. If, on the other hand, the group contained in the group identification information 24 is not found in the access right information 24 of the image data, no permit is given for the image data to be read out. However, even if the group contained in the group identification information 24 is not present in the access right information 24 of the image data, reading out the image data will be permitted provided that the user authorization number tallies with the registrant person number 23 of the image data.

For example, the user who can read out the image data of which the access right information 24 indicates Group A only (see FIG. 7, ①) is the one whose group is indicated as Group A in the group identification information, that is users ① and ② in FIG. 6. The user ③ who does not belong to Group A as indicated in the group identification information can not read out the image data.

Image data indicated as "All" in the access right information 24 (see FIG. 7, ③) can be read out by any user.

The user who can read out image data of which group is not indicated in the access right information 24 (see FIG. 7, ④) is limited to the one who has registered the image data. Anyone other than this user can not read out the image data.

If the foregoing judgement is that the reading out of the image data is permitted, the image data control means 103 directs the registration transfer means 111 to read out the image file tallying with the image ID (Step S 405). According to this direction, the registration transfer means 111 reads out the image data in the image file from the image storage means 108 on the buffer 104, and the image data thus read out are then outputted from the image outputting means 110 (Step S 406).

If, on the other hand, the reading out of the image data is not permitted in the foregoing judgement, the decision is notified to the panel control 101b, which then puts out a display on the operator control panel 101a that the reading out of the image data is not permitted (Step S 407).

As is explained, the confidentiality of the image data filed in the image storage means 108 can be raised by limiting the image data as unit according to the access right information on the image data and the group identification information on the user.

Embodiment 4

Figure 9:
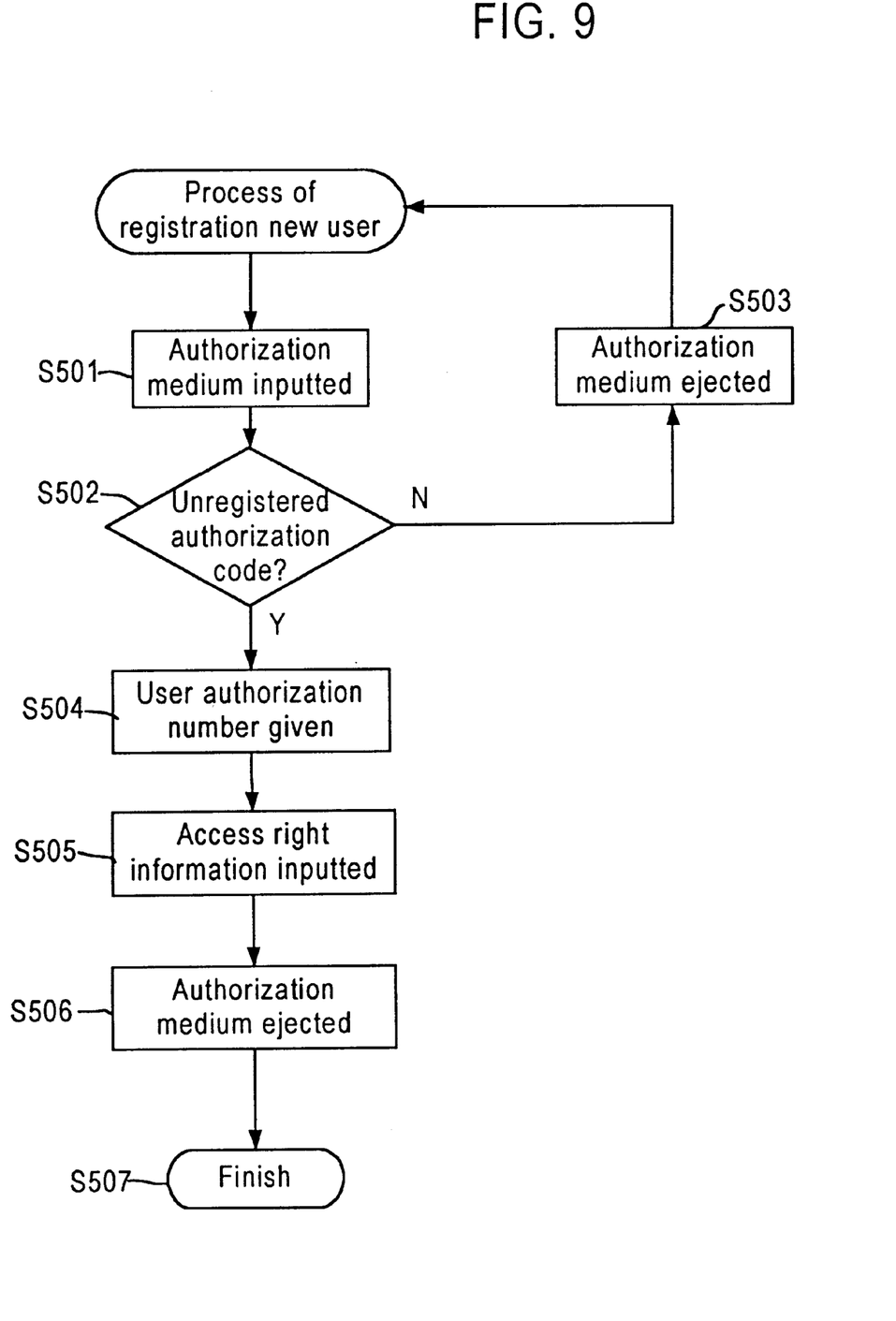
FIG. 9 is a flow chart showing the process of registering a new user in an embodiment of the present invention.

The process of registering a new user in the apparatuses in the foregoing embodiments is hereinafter explained with reference to FIG. 9 showing a flow chart of the process.

First, an unregistered authorization medium 8 is inserted into the authorization code inputting means 102 (FIG. 9, Step S 501). The authorization code inputting means 102 then reads out the authorization code recorded on the authorization medium and notifies the user control means 104. The user control means 104 contacts the user control table 10 with the notified authorization code, and checks if the authorization medium 8 is already registered or not (Step S 502). If it is found to have already been registered, it is so indicated to the user on the operator control panel 101*a*, and duplication of registration is thus avoided. At the same time, the authorization medium 8 is ejected (Step S 503), with the mode returning to the initial state and the insertion of an unregistered medium suggested.

In case the inserted authorization medium is found not registered with the user control table 10, then the user control means 104 issues and notifies a new user authorization number to the user (Step S 504). The user, who is notified of the new authorization number, inputs the group identification information and others on the operator control panel 101*a* (Step S 505). At the same time, the user control means 104 relates and stores the new user authorization number, authorization code, group identification information etc. in the user control table 10. When the process is over, the authorization medium 8 is ejected (Step S 506), completing the registration of the new user (Step S 507).

If the authorization code thus memorized on the authorization medium is not registered with the user control table 10, it can be registered as new entry with ease. Even if, therefore, a magnetic writer or the like is not available at hand, there is no need to have any equipment especially for this purpose; a medium with a distinctive authorization code recorded thereon will do.

It is noted that it is explained in the present embodiment that if the authorization medium is already registered, the mode will return to the initial state. It is also possible to finish the mode when the authorization medium is registered. (Step S 507).

Embodiment 5

Figure 10:
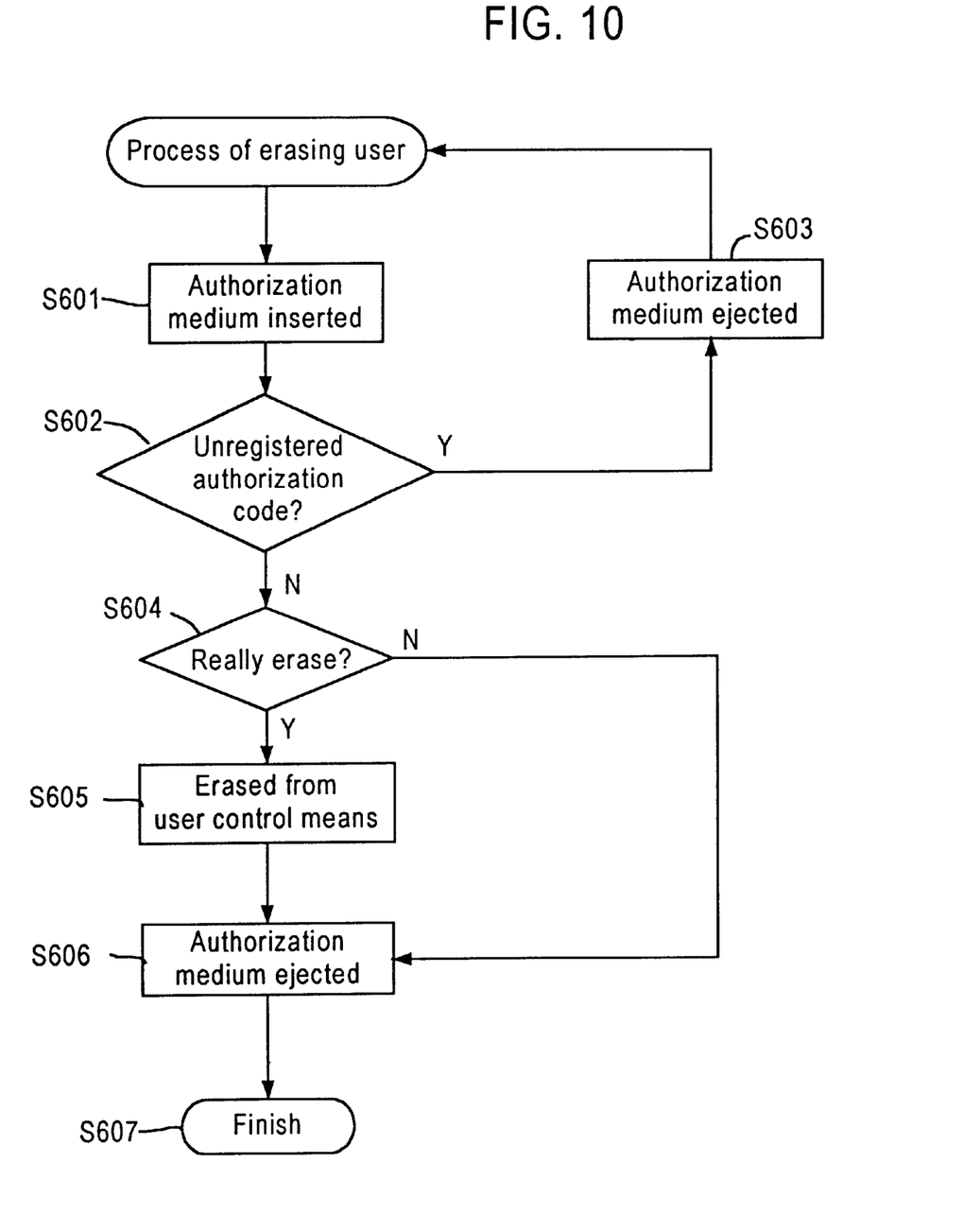
FIG. 10 is a flow chart showing the process of erasing a user registration in an embodiment of the present invention.

Referring now to FIG. 10, there is hereinafter described the process of erasing the user in the apparatuses in the foregoing embodiments. FIG. 10 is a flow chart showing the process thereof.

First, the authorization medium 8 of the user to be erased is inserted into the authorization code inputting means 102 (FIG. 10, Step S 601). The authorization code inputting means 102 then reads out the authorization code recorded on the authorization medium and notifies the user control means 104. The user control means 104 gets access to the user control table 10 with the notified authorization code, and checks if the authorization medium 8 is already registered or not (Step S 602). If the inserted authorization medium 8 is already unregistered, it is so indicated to the user on the operator control panel 101*a*. At the same time, the authorization medium 8 is ejected (Step S 603), with the mode returning to the initial state.

If, on the other hand, the inserted authorization medium is still registered with the user control table 10, it is so indicated to the user on the operator control panel 101*a* that the user registration will be erased and the user is asked to confirm. If the erasing is okayed (Step S 604), the user control means 104 erases all information on the registered user (Step S 605). When the process is over, the authorization medium 8 is ejected (Step S 606), completing the process of erasing the user (Step S 607). As shown, when the user registration is erased, the data registered with the user control table 10 are all erased. Therefore, the authorization medium which has been used by the erased user can be used for a new user by making a new registration according to the procedure outlined in Embodiment 4.

It is noted that it is explained in Embodiment 4 that if the inserted authorization medium is already unregistered, the mode will return to the initial state. It is also possible to finish the mode if the authorization medium is unregistered (Step S 607). It is also so described that if the erasing is not okayed in the erasure confirming stage (Step S 604), the erasing process will end. When the mode returns to the initial erasing state, the initializing will follow the same way (Step S 603).

Embodiment 6

The process of changing cards in the apparatuses in the foregoing embodiments are hereinafter explained with reference to FIG. 11 which shows a flow chart of the process thereof.

Figure 11:
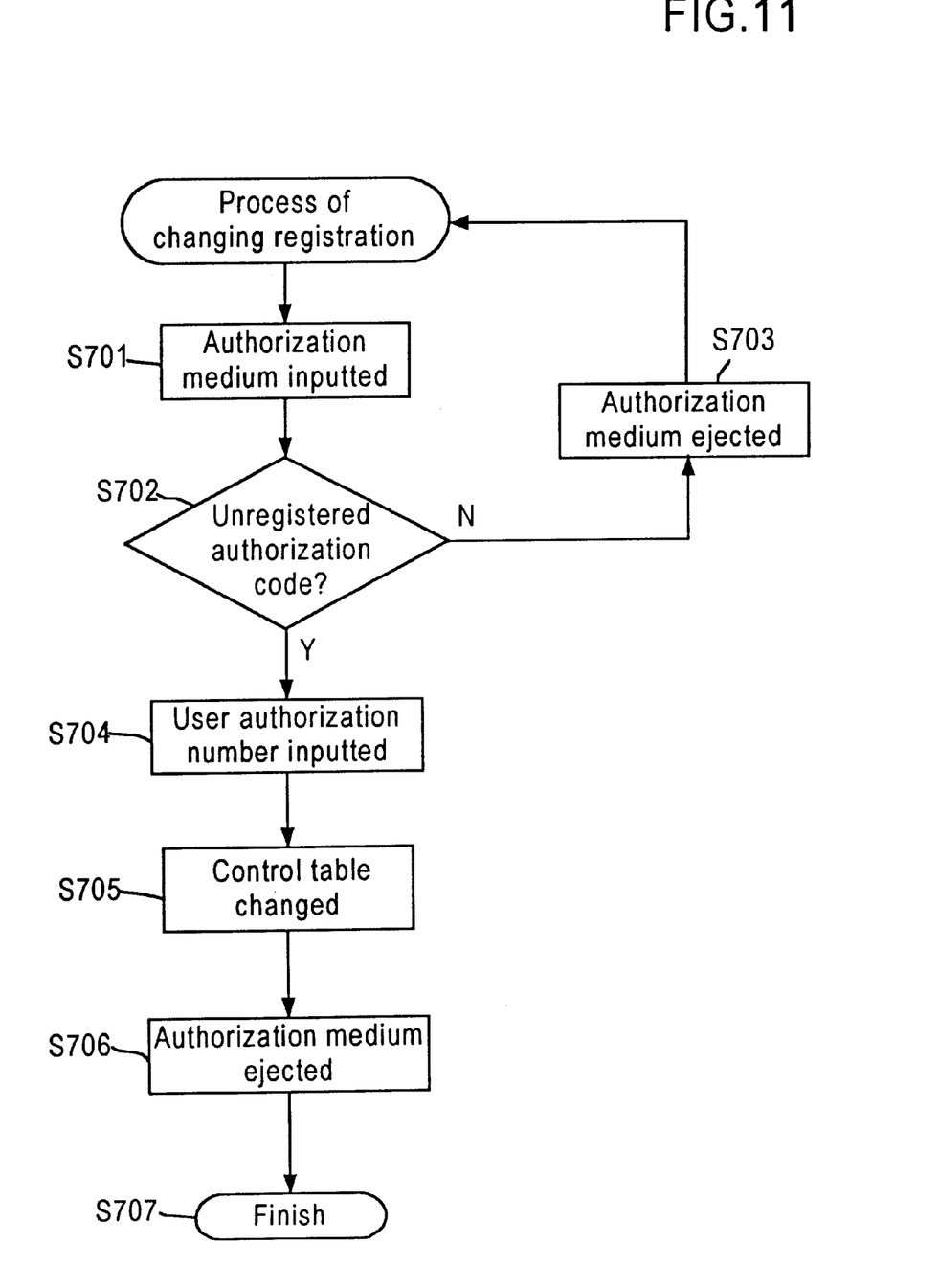
FIG. 11 is a flow chart showing the process of changing registration cards in an embodiment of the present invention.

In case the user wants to replace the registered authorization medium as when the medium is lost, an unregistered authorization medium 8 is first inserted into the authorization code inputting means 102 (FIG. 11, Step S 701). The authorization code inputting means 102 reads out the authorization code recorded on the authorization medium and notifies the user control means 104. The user control means 104 contacts the user control table 10 with the notified authorization code, and checks if the authorization medium 8 is already registered or not (Step S 702). If it is already registered, it is so indicated on the operator control panel 101*a*, with authorization medium 8 ejected (Step S 703) and with the mode returning to the initial state.

Figure 12:
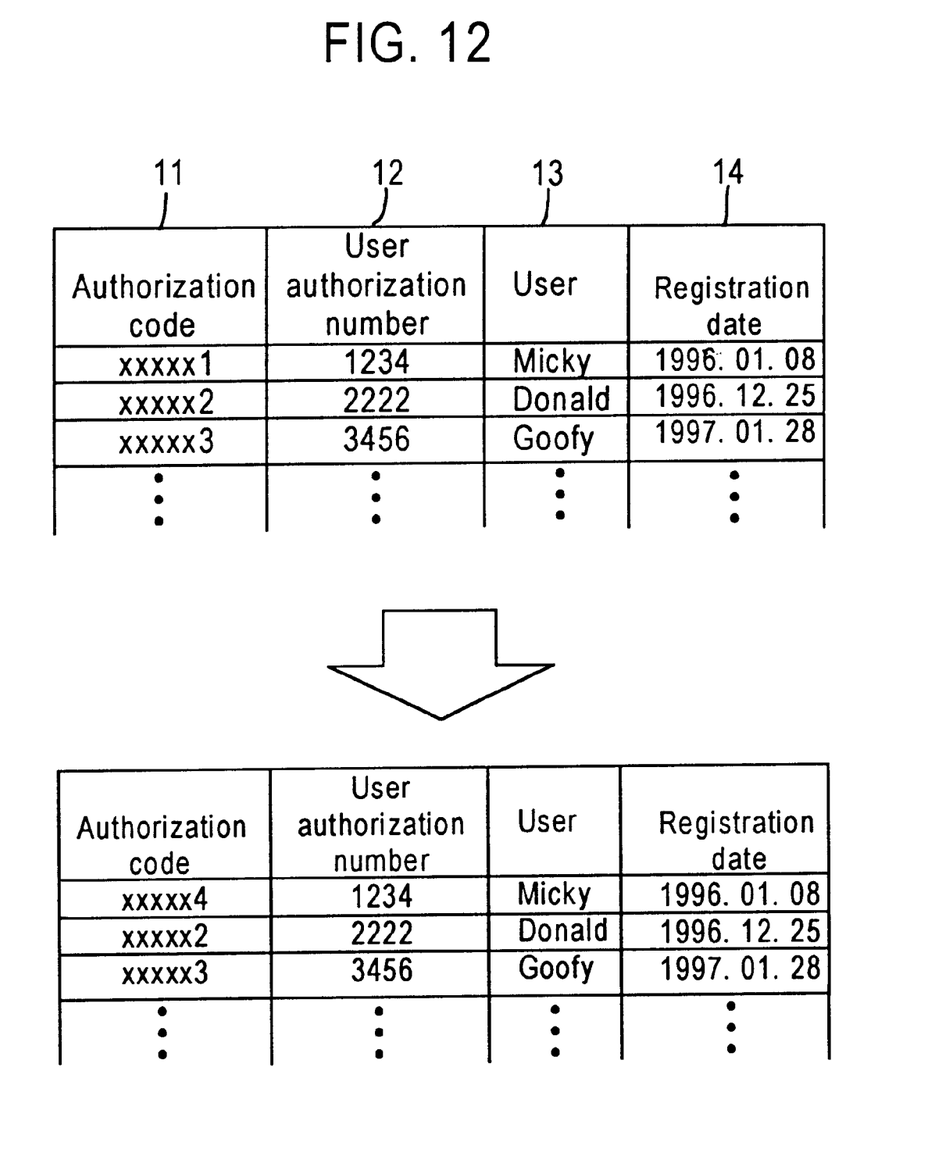
FIG. 12 is a conceptual diagram showing an example of the user control table in changing registration cards in an embodiment of the present invention.

If, on the other hand, the inserted authorization medium is not registered with the user control table 10, the user inputs the user authorization number on the operator control panel 101*a* (Step S 704). The user control means 104 changes the user control table 10 for the user tallying with the inputted user authorization number from the formerly used authorization code to the one on the inserted authorization medium (Step S 705) as shown in FIG. 12. When the process is over, the authorization medium 8 is ejected (Step S 706), completing the process of changing cards (Step S 707).

When the authorization medium is lost or broken, a new authorization medium can be registered taking over the old user information without difficulty as shown.

It is noted that it is explained in the foregoing embodiment that if the inserted authorization medium is already registered, the mode will return to the initial state. It is also possible to finish the mode when the inserted authorization medium is already registered. (Step S 706).

It is so described in the foregoing embodiments that the user authorization number is inputted on the operator control panel 101*a*. It can be so arranged that a password is inputted in addition to the user authorization number. This can easily preclude the possibility of the image processing apparatus being used with some other's user authorization number. In case it is so arranged that a password is inputted in addition to the user authorization number, it has to be so configured that the user control table 10 has the password connected with the user authorization number.

Furthermore, it is possible to freely change the password. For example, a password tentatively inputted as by an apparatus service man can be changed to an easy one. A process example of changing passwords is now explained briefly. First, the authorization medium is inserted into the authorization code inputting means 102 or the user authorization number and the password are inputted on the operator control panel 101a. Then, the password changing function is selected, and the password now in use is inputted on the operator control panel 101a. And a new password is inputted. The user control means 104 contacts the user control table 10 and changes the password connected with the authorization code or the user authorization number. In this way, passwords can be changed with ease.

By the way, the authorization code inputting means 102 can be formed of any equipment using media that can give a distinctive authorization code to each card, i.e., the punched card reader and IC card reader, as well as the magnetic card reader.

It is also so described in the foregoing embodiments that the user ID inputting means is the operating means 101 provided with the operator control panel 101a. The purpose is served just the same by such inputting means as keyboard, ten-key board and touch panel. Remote operation is also possible by such serial communication means like LAN, IrDA and RS 232.

As has been described, the image processing apparatuses according to the present invention, if provided with the authorization code inputting means and the user ID inputting means, can identify the user by a user authorization number inputted from the user ID inputting means even if the authorization medium is not available at hand. And if the user can not be identified, the use of the image processing apparatus can be denied.

Furthermore, since the reading out of the image data as unit is limited on the basis of the access right information on the image data to be read out and the group identification information on the user who wants to read out the data, the confidentiality of the filed image data can be raised.

It is also possible to rake new registration, erase the user registration or change registered cards without difficulty, and one authorization medium can be used in turn.

What is claimed is:

1. An image processing apparatus for storing inputted image data in image storage means and outputting said image data or the image data stored in said image storage means by image outputting means which comprises:

authorization code inputting means for reading in an authorization code from an authorization medium on which said authorization code, a particular one, is recorded;

user identification inputting means for inputting user identification information including an individual authorization number issued at the time of the user being registered;

user control means for controlling the users by said authorization code and said user identification information, and controlling group identification information which indicates a group the user belongs to;

image data control means for associating and controlling said image data, the user who registered said image data and information on access right to said image data showing the scope accessible to said storage means; and function-limiting means for limiting the reading out of said image data from said image storage means on the basis of the user identification and the group identification information furnished by said user control means on the basis of said authorization code inputted by said authorization code inputting means or said user identification information inputted by said user identification inputting means and information supplied by said image data control means on the user who has registered the image data picked out for readout and on said access right to said image data;

said information on access right controlled by said image data control means in relation to said image data being formed of group identification information connected with the user who registers said image data, said group identification information being supplied by said user control means.

2. The image processing apparatus as defined in claim 1, wherein said information on access right controlled by said image data control means in relation to said image data is set by the user who registers said image data.

3. The image processing apparatus as defined in claim 1, wherein said user control means erases all information connected with said authorization code or said user identification information if said authorization code is inputted by said authorization code inputting means or said user identification information is inputted by said user identification inputting means.

4. The image processing apparatus as defined in claim 1, wherein, if an unregistered authorization code is inputted from said authorization code inputting means and said user identification information on a user wishing to change the code is inputted from said user identification inputting means, said user control means changes the authorization code related to said user identification information to said unregistered authorization code.

5. An image processing apparatus for storing inputted image data in image storage means and outputting said image data or the image data stored in said image storage means by image outputting means which comprises:

authorization code inputting means for reading in an authorization code from an authorization medium on which said authorization code, a particular one, is recorded;

user identification inputting means for inputting user identification information including an individual authorization number issued at the time of the user being registered;

user control means for controlling the users by said authorization code and said user identification information; and function-limiting means for limiting the scope of functions that can be used by the user in case the user can not be identified by said authorization code inputted by said authorization code inputting means or said user identification information inputted by said user identification inputting means;

said user control means erasing all information connected with said authorization code or said user identification information if said authorization code is inputted by said authorization code inputting means or said user identification information is inputted by said user identification inputting means.

6. The image processing apparatus as defined in claim 5, wherein said user identification information is said user authorization number.

7. The image processing apparatus as defined in claim 6, wherein, if an unregistered authorization code is inputted from said authorization code inputting means, said user control means issues a user authorization number, notifies the user of said user authorization number and at the same time newly registers said authorization code and said user authorization number.

8. The image processing apparatus as defined in claim 5, wherein said user identification information is said user authorization number and a password.

9. The image processing apparatus as defined in claim 8, wherein, if an unregistered authorization code is inputted from said authorization code inputting means, said user control means issues a user authorization number, notifies the user of said user authorization number and at the same time newly registers said authorization code and, furthermore, if a password is inputted by said user from said user identification inputting means, said user control means newly registers said authorization code, said user authorization number and said password.

10. The image processing apparatus as defined in claim 8, wherein, if an unregistered authorization code is inputted from said authorization code inputting means or said user identification information is inputted from said user identification inputting means, and a new password is inputted, said user control means changes said password corresponding to said authorization code or said user identification information to said new password.

11. An image processing apparatus for storing inputted image data in image storage means and outputting said image data or the image data stored in said image storage means by image outputting means which comprises:

authorization code inputting means for reading in an authorization code from an authorization medium on which said authorization code, a particular one, is recorded;

user identification inputting means for inputting user identification information including an individual authorization number issued at the time of the user being registered;

user control means for controlling the users by said authorization code and said user identification information; and     function-limiting means for limiting the scope of functions that can be used by the user in case the user can not be identified by said authorization code inputted by said authorization code inputting means or said user identification information inputted by said user identification inputting means, wherein     if an unregistered authorization code is inputted from said authorization code inputting means and said user identification information on the user changing the code is inputted from said user identification inputting means, said user control means changes the authorization code related to said user identification information to said unregistered authorization code.

12. The image processing apparatus as defined in claim 11, wherein said authorization code inputting means is either a magnetic card reading apparatus, a punched card reading apparatus or an IC card.

13. The image processing apparatus as defined in claim 11, wherein said user identification inputting means is either a keyboard, a ten-key board or a touch panel or a serial communication means.

* * * * *